United States Patent
Cronce et al.

(10) Patent No.: US 7,188,241 B2
(45) Date of Patent: Mar. 6, 2007

(54) PROTECTING SOFTWARE FROM UNAUTHORIZED USE BY APPLYING MACHINE-DEPENDENT MODIFICATIONS TO CODE MODULES

(75) Inventors: Paul A. Cronce, San Jose, CA (US); Eric C. Anderson, San Jose, CA (US)

(73) Assignee: Pace Antipiracy, San Jose, CA (US)

( * ) Notice: Subject to any disclaimer, the term of this patent is extended or adjusted under 35 U.S.C. 154(b) by 917 days.

(21) Appl. No.: 10/271,691

(22) Filed: Oct. 16, 2002

(65) Prior Publication Data

US 2004/0078585 A1    Apr. 22, 2004

(51) Int. Cl.
*H04L 9/00*     (2006.01)
*G06F 17/30*    (2006.01)
*G06F 9/44*     (2006.01)
*G06F 9/45*     (2006.01)

(52) U.S. Cl. ............. 713/155; 713/176; 713/181; 726/26; 717/168; 717/140

(58) Field of Classification Search ............. None
See application file for complete search history.

(56) References Cited

U.S. PATENT DOCUMENTS 4,558,176 A * 12/1985 Arnold et al. ............. 713/190
4,901,231 A * 2/1990 Bishop et al. ............. 707/205
5,925,127 A * 7/1999 Ahmad ..................... 726/31
2005/0210275 A1* 9/2005 Homing et al. ........... 713/190

FOREIGN PATENT DOCUMENTS

EP    1243998 A1 * 9/2002

OTHER PUBLICATIONS

Prof. Dorothy E. Denning, COSC 350: Codes and Ciphers, Digital Certificates, PKI, Key Recovery, Apr. 2, 2002.*
R. Housley, Triple-DES and RC2 Key Wrapping, Dec. 14, 2001, IP.com, IPCOM000006213D.*

* cited by examiner

*Primary Examiner*—Antony Nguyen-Ba
(74) *Attorney, Agent, or Firm*—Strategic Patent Group

(57) ABSTRACT

A method and system for providing anti-piracy protection to a software application on a server connected to a target machine over a network is described. The method includes providing a server with a server application for modifying the application software based on a machine fingerprint of the target machine, and for receiving and storing the application software. The server application receives the target machine fingerprint in conjunction with a license transaction between the server and the target machine. The server then modifies the application software using the received machine fingerprint, and provides the resulting modified software to the target machine, wherein the supplied software will only operate correctly on the target machine.

11 Claims, 5 Drawing Sheets

PROTECTING SOFTWARE FROM UNAUTHORIZED USE BY APPLYING MACHINE-DEPENDENT MODIFICATIONS TO CODE MODULES

CROSS-REFERENCE TO RELATED APPLICATION

This patent application is related to Co-pending U.S. patent application Ser. No. 10/177,499, filed Jun. 21, 2002 entitled "PROTECTING SOFTWARE FROM UNAUTHORIZED USE BY CONVERTING SOURCE CODE MODULES TO BYTE CODES."

FIELD OF THE INVENTION

The present invention relates to anti-piracy protection for software applications, and more particularly to preventing the proper execution of a software application on any machine other than the licensed machine.

BACKGROUND OF THE INVENTION

Software licensing and anti-piracy protection has been used for some time in the software industry as a means of controlling use of software, and more particularly, for the purpose of limiting or eliminating unauthorized use of software, known as software piracy.

The resulting economic dislocation that occurs due to software piracy is severe. As the cost of developing and supporting software programs increases, the need to reduce piracy grows. One of the key elements of reducing software piracy is through the use of an electronic software license, delivered to the authorized user to enable the software program to operate. The electronic license includes the required information in a form that is understood by the software program, and contains license terms.

License terms are the terms that apply to the use of the particular copy of the software program, and can include a start date, an end date, a number of program launches, fingerprint information to limit use on a specific local area network or on a specific machine, and other controlling information. For increased security, the electronic software license may be encrypted to hamper hacker efforts to bypass its function. This requires that the software program contain a decryption key to decrypt the license before extracting the information required.

One of the limitations of typical machine fingerprinting solutions is the accessing of the fingerprint information and the determination of a correct, matching fingerprint is completed during the protection execution phase of an application. Thus, if the application can be separated from the protection wrapper, it will execute correctly on any machine.

In addition to license files, other anti-piracy tools have been employed. These tools typically are used to add various types of authentication to the program being protected, such as decryption, checksum validation, and overriding various debug mechanisms in the operating system and hardware. All of these and other techniques were created for the purpose of making it difficult for a software hacker to break into the application code and remove it from its protection "wrapper" so it can be provided free of any license terms at no cost or very low cost, and where the software publisher receives no payment of any kind for its use. The process of adding protection software to a software application is often referred to as "wrapping." Wrapping tools are typically sold to software developers, who then perform the wrapping process on each software program prior to shipping the software to customers.

Because the runtime environment for the software program and its protection wrapper is typically unprotected, such as with Microsoft Corporation's Windows™ operating system, and because a large number of programmers have extensive knowledge of programming on such a system, it is difficult to effectively protect software running on such machines. In addition to having extensive knowledge of the operating environment, hackers also can purchase or "borrow" a copy of the protection-wrapping tool. By studying the operation of the tool, the hacker gains a much deeper understanding of the protection mechanisms and techniques used by the tool than by studying only the resulting protected software, resulting in much less work to compromise a given protected software product. In fact, the level of difficulty for breaking protected code without this additional and is sufficiently high that most hackers will take great pains to acquire a copy of the protection tool for the purpose of studying its operation. Thus, it is extremely important to protect the wrapping tool itself. Otherwise, if the tool finds its way into the wrong hands, the security of every program wrapped for protection by the tool is at a substantially higher risk of being compromised.

Many of the techniques described above use encryption and debugging suppression features, often requiring kernel-level drivers to implement successfully and clandestinely. Unfortunately, this technique of using kernel-level drivers is susceptible to driver architecture changes and system configuration variations, and thus requires a high level of customer support. While the level of support required is reasonable for a small market, large markets cannot tolerate the support costs, and require other solutions.

Accordingly, what is needed is a method for fingerprinting an application such that the fingerprinting is distributed in the application rather than only being executed prior to the application itself, thus increasing the level of difficulty of removing the fingerprinting from the application. The present invention addresses such a need.

SUMMARY OF THE INVENTION

The present invention provides a method and system for providing anti-piracy protection to a software application on a server connected to a target machine over a network. The method includes providing a server with a server application for modifying the application software based on a machine fingerprint of the target machine, and for receiving and storing the application software. The server application receives the target machine fingerprint in conjunction with a license transaction between the server and the target machine. The server then modifies the application software using the received machine fingerprint, and provides the resulting modified software to the target machine, wherein the supplied software will only operate correctly on the target machine.

In another aspect of the invention, the server only modifies selected portions of the application code, and provides the fingerprinted code modules to the target machine, where they are combined with the remaining portion of the application. The completed application will then only run correctly on the target machine.

According to the system and method disclosed herein, the present invention prevents illegal copying of software by preventing proper execution on any machine other than the licensed machine.

Additionally, by adding obfuscation of program execution, and in particular to protection program execution without using kernel level drivers, the difficulty for a hacker to determine what work is being done by the application and its protection logic is increased. Finally, the protection-wrapping toolset can be provided on a secure server, thus eliminating the opportunity for studying the tool processing method, and thereby increasing the security of the protection.

DETAILED DESCRIPTION

The present invention relates to a method and system for providing anti-piracy protection for a software application. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
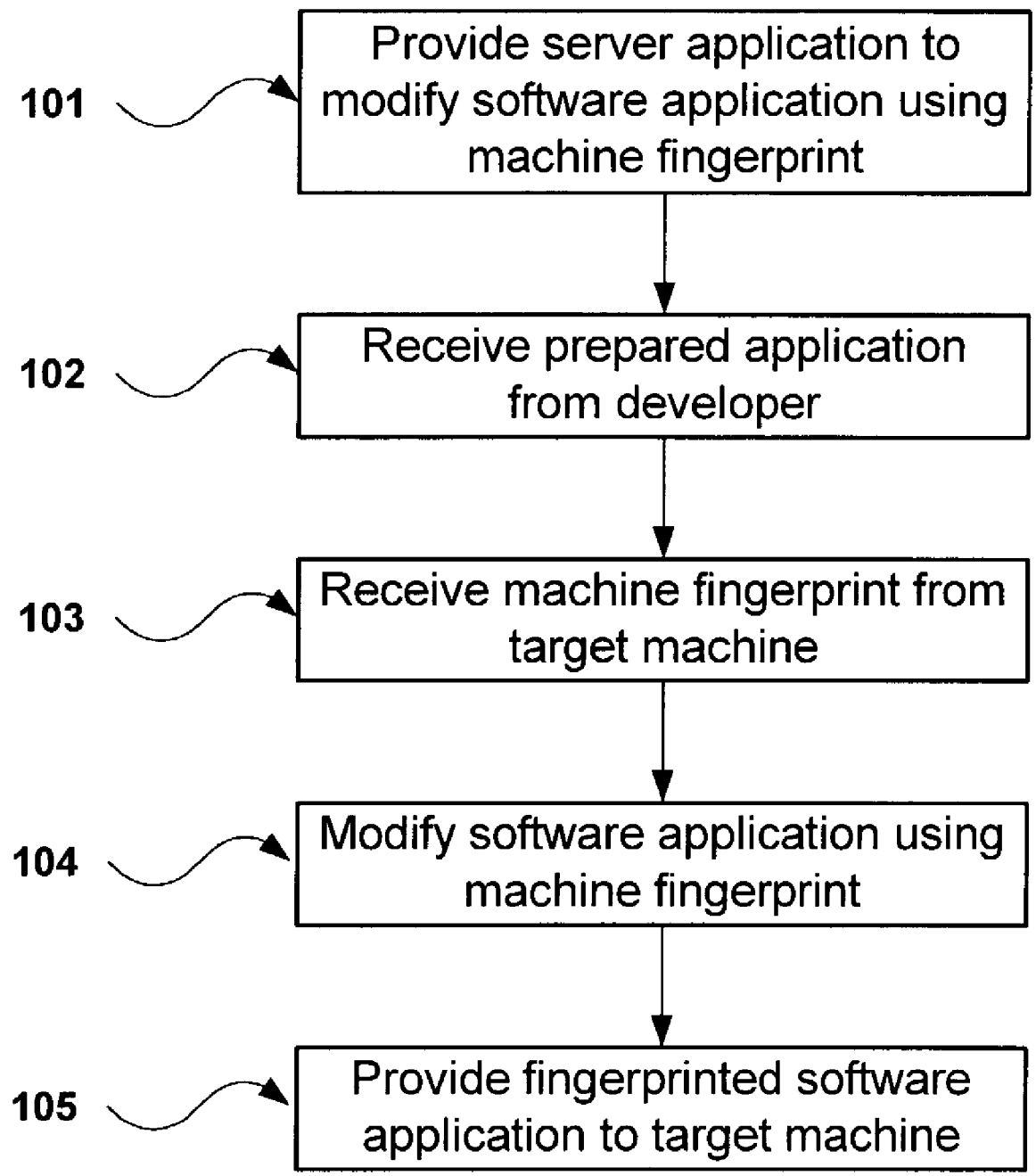
FIG. 1 is a flow diagram of the method for protecting an application using the present invention.

Referring to FIG. 1, a flow diagram of the method for protecting an application using the present invention is shown. In step 101, a server and server application designed to modify a software application to require a specific machine fingerprint for proper execution is provided. The server also provides instructions to the publisher for the preparation of an application for uploading to the server. In step 102, the server receives prepared application code from a publisher for modification. In step 103, a machine fingerprint is received from the target machine as part of a financial transaction. Typically, this transaction is a purchase transaction, or a licensing transaction. In step 104, the server uses the received target machine fingerprint to modify the application software. Once modified, the application will only execute correctly on the target machine from which the fingerprint was generated. One method for obtaining a fingerprint of the target machine is to use a helper application, downloaded by the browser on the target machine. The helper application is responsible for collecting the required machine information, and uploading it to the server. The machine information can either be converted to a fingerprint by the helper application or by the server application. The method of generating a machine fingerprint from selected machine hardware information is well known by those of ordinary skill in the art, and will not be described herein.

Once the application has been modified, it is downloaded to the target machine for execution, in step 105. Copies of the application can be created, but the copies will not execute on any other machine than the target machine. Therefore, illegal duplication and distribution of the software application is prevented. An alternative to the method described in FIG. 1 is for the server to modify only selected portions of the application with the machine fingerprint, and only download the resulting fingerprinted code modules to the target machine. In this case, the remaining portion of the application is already resident on the target machine, provided in some other manner, such as from a CD. The downloaded fingerprinted modules are used to complete the application, wherein the application can only execute properly on the target machine.

Figure 2:
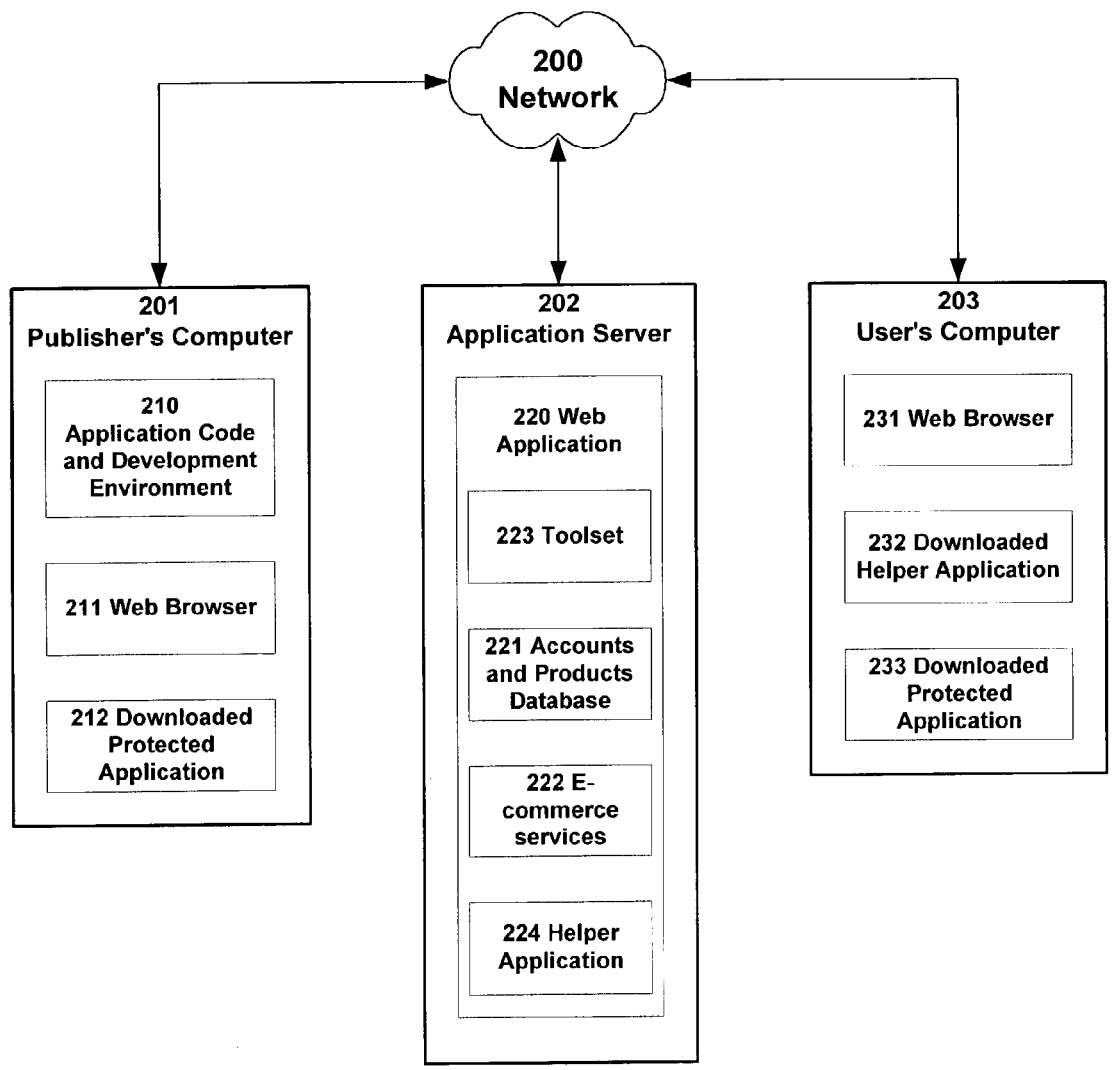
FIG. 2 is a block diagram of the server used to protect software according to the present invention.

Referring to FIG. 2, a block diagram of a server application 220 used to protect software according to the present invention is shown. Also shown are a publisher's computer 201, an application server 202, and the user's or target computer 203, all connected via network 200. Note that all machines do not have to be connected at the same time. Typically, computer 201 and server 202 are connected in order to set up accounts on the server 202 and upload the application to be protected. At a later time, a user enters into a financial or licensing transaction with the server 202, and receives the protected application fingerprinted to run on his machine 203. Alternatively, the user receives fingerprinted modules that complete the application already resident on the user's machine, acquired by some other means. In either case, the application will only run correctly on the user's machine 203. Copies of the application will fail to operate correctly when moved to different machines, thus reducing software piracy.

The original publisher's copy of the application 210 to be protected resides on the publisher's computer 201, along with the development environment. Also resident on the publisher's computer 201 is a web browser 211, such as Internet Explorer™ from Microsoft Corporation. This browser 211 is used to connect to the web application 220 for the purpose of establishing a publisher's account with the server 202. Information about an account is stored in an accounts and products database 221. Typically, the identity of the publisher is verified prior to setting up an account. One way to accomplish this is by the use of digital certificates from a trusted issuing agency. Digital certificates are well understood by one of ordinary skill in the art, and therefore will not be discussed in detail herein.

The reason for establishing the identity of the publisher is to minimize the risk of information about the server 202 and its functions from being transferred to software pirates. It is well known that having access to the protection tools enables a hacker or pirate to more easily defeat the protection mechanisms used to protect a software application from being pirated. Therefore, establishing the credentials of a potential customer is of critical importance.

Additionally, the application server 202 provides information to the publisher on how to prepare an application for protection and uploading to the server 202. This information must be the minimum to enable a publisher to properly prepare the application for upload. It is not recommended that any explanation be given as to why various steps in the preparation are required, nor is it recommended that any information on the process used to protect the application be provided. Thus, only the preparation method is given. This minimizes the potential information transfer to "friends" of a legitimate software publisher who might be software pirates. The process used by the publisher to obtain a protected downloaded application 212 will be described below in conjunction with FIG. 3.

In an alternate embodiment, no preparations to the application 210 are required from the software publisher. However, in this case, the entire application 210 in source code format is uploaded to the server 202. In this case, the toolset 223 operates on the entire application 210, and either includes the selection function normally provided by the publisher as described herein, or operates on the entire application 210. The advantage of this is that no information on what modifications are made are divulged to the publisher, and therefore cannot be passed on to a hacker "friend" by a publisher or employee of the publisher. The disadvantage is that the source code for the application 210 must be revealed to the server 202. Clearly, in this case, a high trust relationship between the owner of server 202 and the publisher is required. Another aspect of this approach is that the toolset 223 must act on much more source code than the preferred embodiment, where the publisher selects portions of the application to protect. This requires a much higher performance in the server 202 to minimize the delay between receiving the fingerprint information and when the protected application can be delivered.

Once retrieved, the protected application 212 is tested thoroughly by the publisher. In the preferred embodiment, the publisher, using his access ID and password related to his account on the server 202 may download a copy of the application processed to work on any number of computers of his own choosing. This enables the publisher to check the proper operation of the protection services with various computer configurations, models, and with various operating systems. This is accomplished by accessing the server 202 from each of the machines required for testing, and allowing the machine fingerprint to be generated for protecting the application for that machine.

The server application 220 includes a set of functions to support its operation. These functions include the protection toolset 223, the accounts and products database 221, e-commerce services 222, and a helper application 224. As described above, the helper application 224 is downloaded via the browser 211 and provides the function of generating the machine fingerprint on the requesting machine. The result of this calculation is sent back to the server 202 for use by the toolset 223 in creating a protected application. The operation of such a "helper application 224" is well known by one of ordinary skill in the art, and will not be described in detail herein.

The preferred embodiments of the protection mechanisms used by the toolset 223 will be described below in some detail. In addition to the protection of the present invention, the toolset 223 may incorporate other protection mechanisms, including placing the application within a "protection wrapper" and where the protection method of the present invention is only one part of the total protection provided by the toolset 223.

Once the publisher has verified the proper operation of the protected application 212, it can be released for sale. This can be done in one or two ways. In the preferred embodiment, the entire application is delivered as part of the financial or licensing transaction with the user's computer 203, along with specific license terms. However, an alternate embodiment is to sell the application with some key modules missing. When the application is installed, a connection is made to the server 202 to request the remaining modules. This can be done in conjunction with a licensing transaction, including demo or trial periods, various levels of functionality, and licensing for a set period of time. In any case, the browser 231 on the user's computer 203 downloads the helper application 232 from the server 202, which in turn uploads the fingerprint or machine information obtained from the user's computer 203, and receives the missing modules to complete application 233. With the addition of the missing modules, the application 233 can run correctly on the user's machine 203, according to the license terms set during the server transaction.

Figure 3:
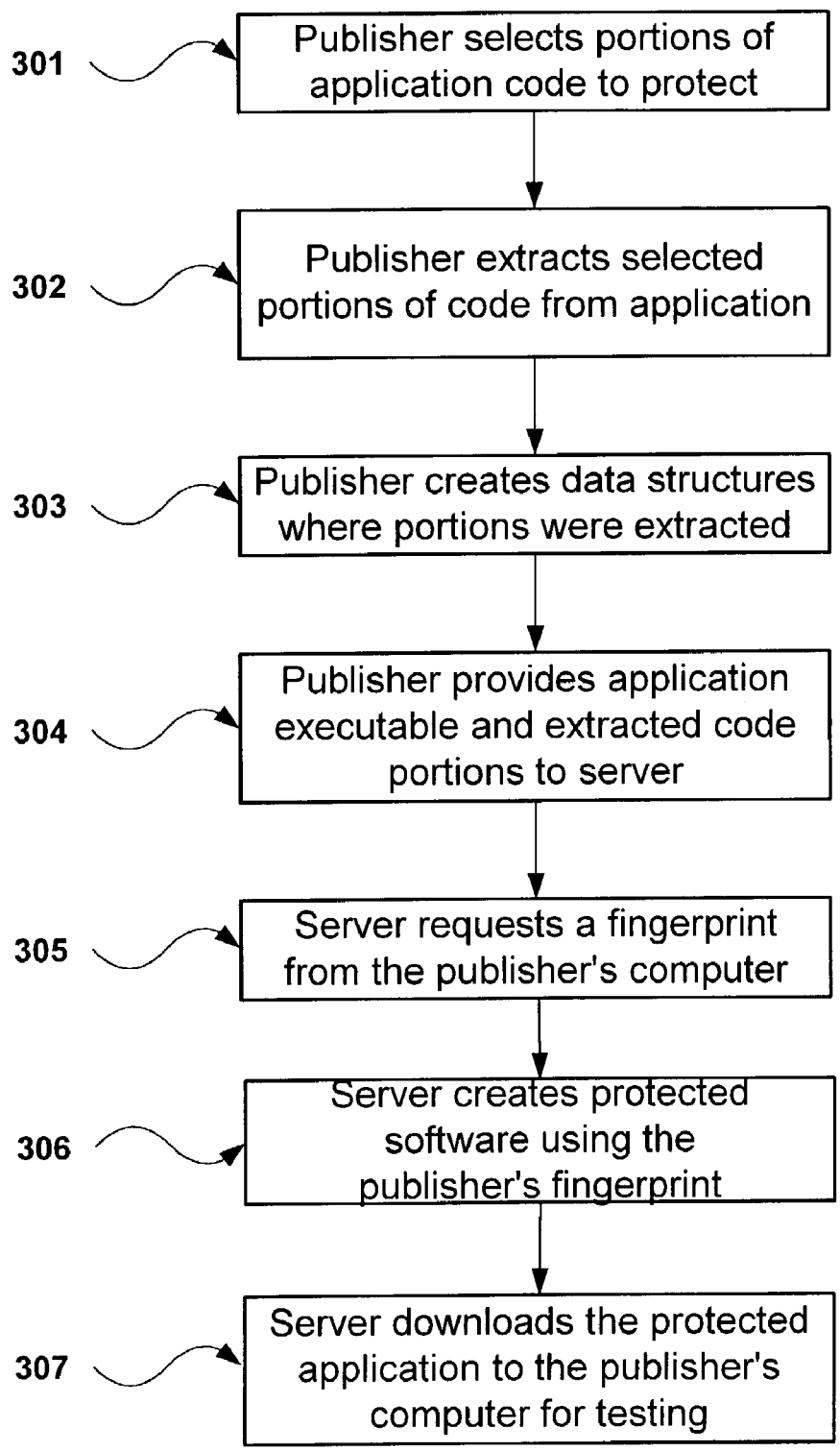
FIG. 3 is a flow diagram showing how a software publisher prepares an application for protection with the present invention.

The process used by the publisher working in conjunction with the server application 220 to create a protected application is shown in FIG. 3. It is assumed that the publisher has already established an account on server 202, and has read any instructions provided by server application 220. In step 301, the publisher selects portions of the application code to protect. There are many considerations for this step. In order to ensure maximum protection, the selected modules should be ones that execute frequently during the normal operation of the application 210, and preferably are part of the highest value add portions of the application—the parts that make the application more valuable than the competing applications.

In step 302, the selected portions of code are extracted from the application. In step 303, data structures are created according to the instructions provided, and placed where the removed portions of code were removed. These data structures may contain instructions to the development environment used to generate executable code to generate information, either within the application itself, or in related data files, such that the server toolset 223 can locate the data structures within the executable code of the application.

In step 304, the publisher provides the application executable generated by the development environment or compiler to the server 202, along with the extracted portions of source code. Assuming this is the first time, the server application 220 initiates a fingerprint generation cycle on the publisher's computer 201. Once the machine fingerprint is generated, the toolset 223 applies the fingerprint to the selected portions of source code, and builds the completed protected application. This process will be described in more detail below. The protected application is then downloaded to the publisher's computer 201 for testing.

Figure 4:
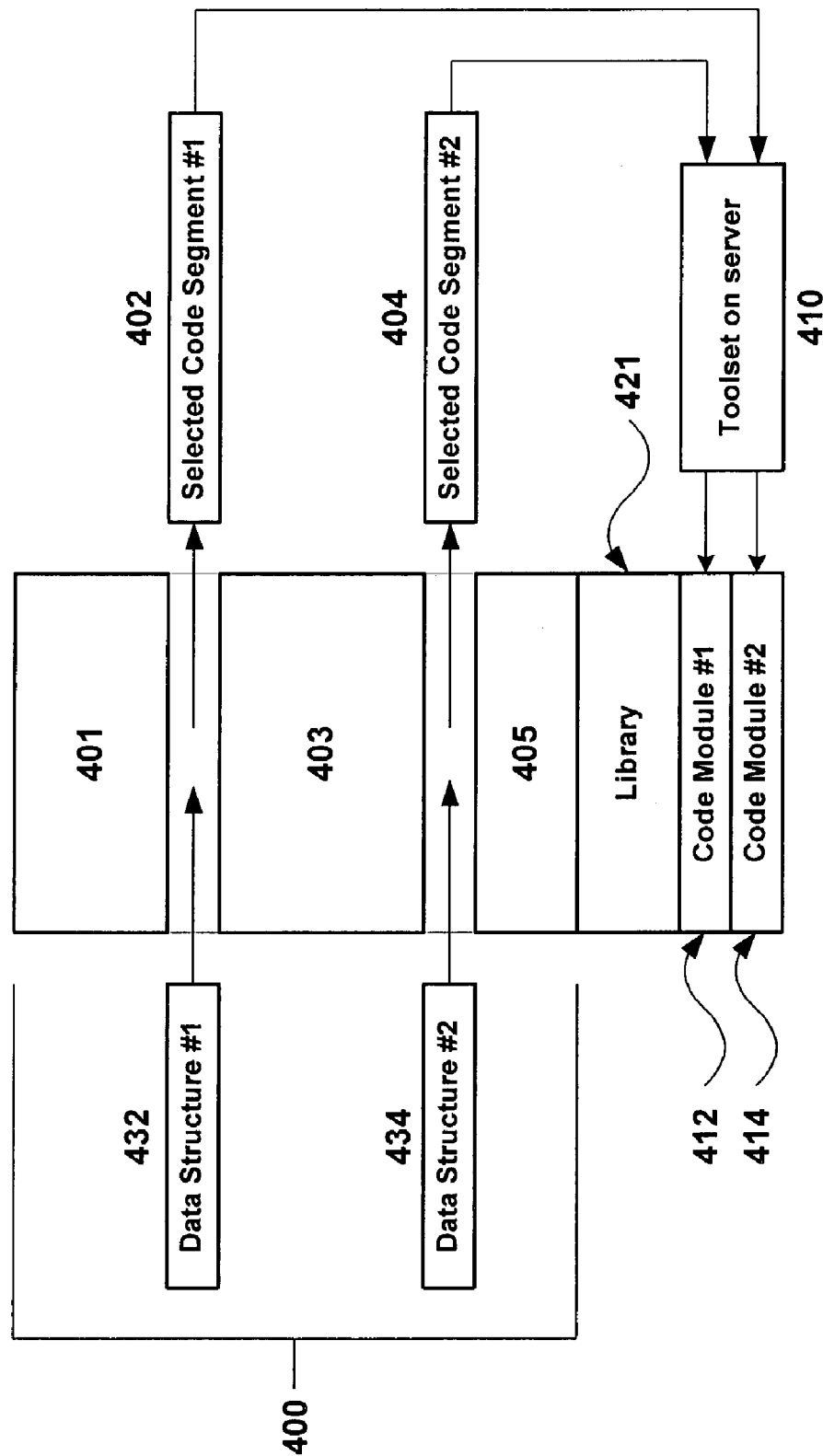
FIG. 4 is a block diagram showing the modification of an application to be protected.

Referring to FIG. 4, a block diagram of the modification of an application to be protected is shown. The unprotected application 400 includes two selected code modules 402 and 404, and code blocks 401, 403, and 405. In this example, only two code modules are selected. However, any number of code modules can be selected for protection. By protecting more modules, the protection effectiveness increases.

The selected modules 402 and 404 are replaced by data structures 432 and 434 in such a way that the toolset 223 can locate them in the application once it is compiled into executable code by the development tools on the publisher's computer 201. The toolset 223 applies the machine fingerprint to the selected code modules 402 and 404, and compiles them into executable code modules 412 and 414. An additional library module 421 is also included to provide the required support for modules 412 and 414. Specifically, the library 421 includes functions relating to accessing fingerprint information from the host machine and using it in various ways, typically by function calls from modules 412 and 414. In the preferred embodiment, library 421 will continuously update the machine fingerprint information during the execution of the protected application, rather than computing the machine fingerprint only once prior to the execution of the protected application. In this way, bypassing the initial computation of the machine fingerprint and substituting a known value will not remove the protection from the application.

Library 421 ideally would be provided as a set of blocks distributed within the application for maximum protection. However, this is only practical in the alternate embodiment where the entire application source code is provided to the server 202. This method is more secure, because less knowledge is required by the publisher to use the protection service provided by the server 202, and thus potential leaks to hackers are reduced. In addition, the protection code can be distributed throughout the application, making it much more difficult to find and defeat.

The protected application can be delivered by the server to the developer in several ways. In the preferred embodiment, the entire protected application is provided. In this case, no instructions on how to complete the data structures is required, because that step is completed by the toolset 223. Specifically, the data structure is populated with the required code to access the protected module, and may also be populated with other information for the purpose of obfuscating the data structure, such as random codes. Also, any information about the location and existence of the data structures should be removed from the executable. Otherwise, this information would be useful for a hacker to find the data structures, and make it easier to defeat the protection.

In an alternate embodiment, the application and completed data structures, plus the library 421 is kept separate from the protected code modules 412, and 414. Any possible variations in protected code modules 412 and 414 for different machine fingerprints must be taken into account in this case, because the application data structures cannot be updated for each fingerprint processed. The main body of the application, minus the protected modules 412 and 414 is delivered to the customer in the usual way, such as on a CD or floppy disk. When the licensing transaction between the user's computer 203 and the server 202 takes place, only the protected modules 412 and 414 are downloaded to the user's computer. The combination of the protected modules 412 and 414 and the main application block consisting of code blocks 401, 403, 405, the library, and data structures 432 and 434 and thus combined. The resulting combination is the protected application that will only operate properly on the user's machine 203.

Figure 5:
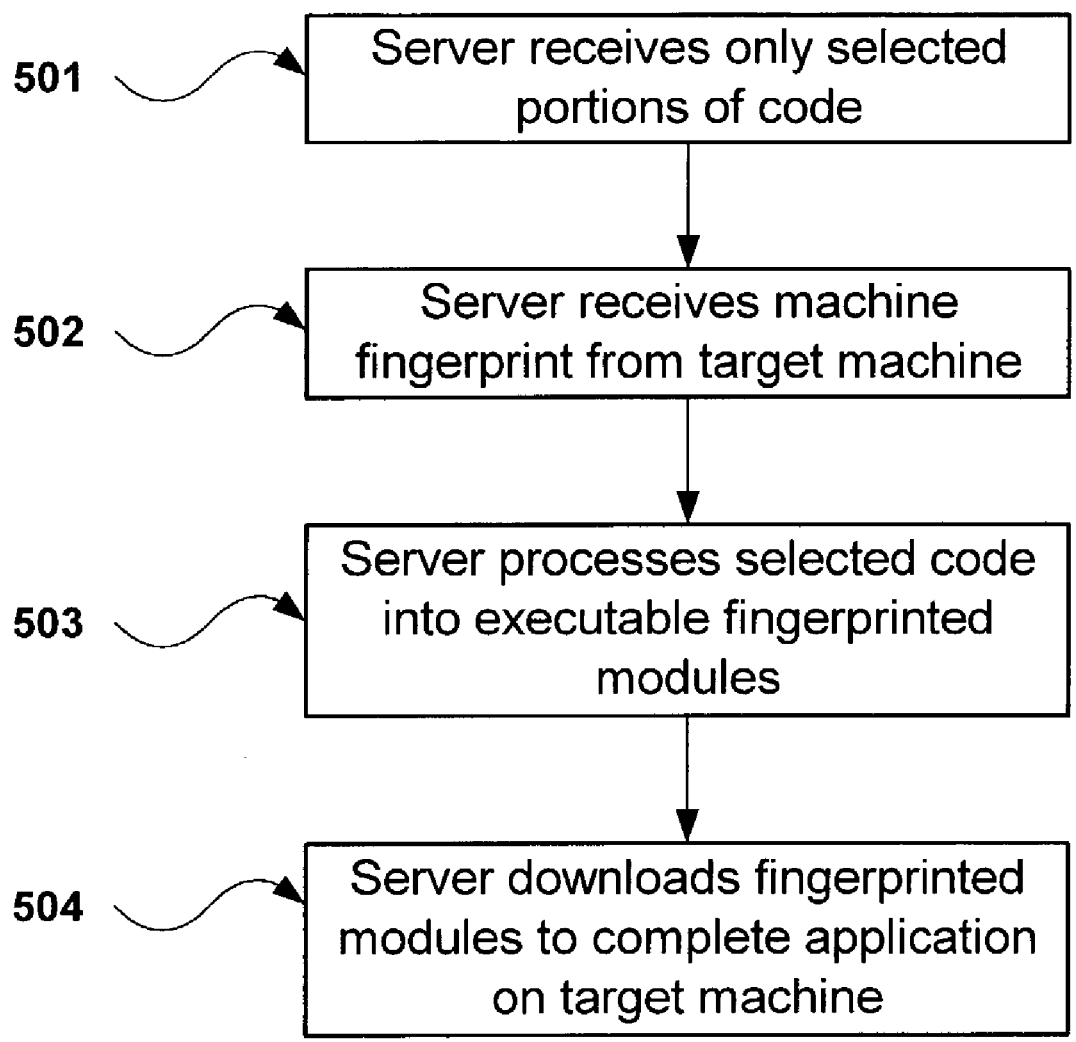
FIG. 5 is a flow diagram of the method for processing only selected portions of the application on the server.

Referring to FIG. 5, a flow diagram of the method for processing only selected portions of the application on the server is shown. In step 501, the server receives the selected portions of code 402 and 404. The remaining application code, including library 421 and data structures 432 and 434 has been delivered to the publisher ready to be combined with protected modules 412 and 414. This incomplete application is provided by some means to the end user. In step 502, the server 202 as part of a licensing transaction receives the machine fingerprint from the user's machine 203. The server 202 then processes the code 402 and 404 into protected modules 432 and 434. In step 504, these modules 432 and 434 are downloaded to the user's machine 203, where they are combined with the main body of the application to form a completed and protected application. This application will only run correctly on the user's machine 203.

The process of the present invention for applying a machine fingerprint to an application has been disclosed. The primary variations disclosed include:
1. Protecting the entire application, and downloading the entire protected application from the server
2. Protecting selected portions of the application, and delivering the entire application from the server
3. Protecting selected portions of the application, and delivering only the protected modules from the server. The main body of the application is delivered in some other manner.

There are several methods for machine fingerprinting the code modules 402 and 404. One method includes conversion to byte codes. Another includes using a pre-processor on the source code, and then compiling to executable code. Both methods have numerous variations. The two primary approaches and some major variations will be briefly discussed below. However, there are many other methods for achieving the goal of making code execution successful only on a given machine that are well known by one skilled in the art, and therefore an exhaustive list and description will not be given herein.

Co-pending patent application Ser. No. 10/177,499, filed Jun. 21, 2002 describes various methods for applying an initialization vector to protect code, and is incorporated herein by reference. The same methods for applying an initialization vector for protecting application code described in the referenced patent application can also be used where the machine fingerprint is substituted for an initialization vector. Specifically, the selected portions of code can be converted to byte codes, and the byte code itself, the byte code compiler, and the byte code libraries can be modified in the various ways described using the machine fingerprint, rather than an initialization vector. In this way, the byte codes can be executed correctly only on the target machine.

This approach affords high protection: not only is the code execution dependent on the proper machine fingerprint, but the execution path of the code is obfuscated by use of the byte code compiler.

Another approach for protecting portions of code or the entire application is the use of a code pre-processor. This approach is also described in the referenced patent application using an initialization vector. In this application, a machine fingerprint would be substituted for the initialization vector. The pre-processor is designed to receive the code and the machine fingerprint. The information in the fingerprint is applied to the programming statements being processed such that the proper results only occur when the fingerprint used during the preprocessing matches the machine fingerprint of the host machine. For example, every constant in the source code, rather than being defined, can be computed from the machine fingerprint. If the value of 1278 is required in the program for proper execution, this value can be extracted from the machine fingerprint at runtime. One method is to simply generate the exclusive OR between the value and some portion of the fingerprint, and use this value in the program. This value is then exclusive OR'ed with the host machine fingerprint during program execution, resulting in the recovery of the original value, assuming the host machine has the same fingerprint as the original machine requesting the license. There are many other methods of using the machine fingerprint to modify the source code, known by one of ordinary skill in the art. Thus, these various techniques will not be discussed in detail herein.

Once the pre-processor 223 has completed making machine fingerprint dependent modifications to the source code, the source code is compiled into machine executable form. If the code represents extracted code modules 402 and 404, then the protected modules 412 and 414 are downloaded to the user's machine 203 and combined with the main body of the application. If the source code is the entire application, then the entire application is downloaded to the target machine 203. In either case, the resulting application 233 will only execute properly on the target machine.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into a server or stand-alone computer for execution. Accordingly, many modifications may be made by one of ordinary skill in the art without departing from the spirit and scope of the appended claims.

What is claimed is:

1. A method for providing anti-piracy protection by machine fingerprinting a software application on a server, the method comprising:
   (a) providing the server with a server application for receiving and storing the application software, and for modifying the application software based on a machine fingerprint;
   (b) receiving by the server application the machine fingerprint from a target machine during a license transaction between the server application and the target machine;
   (c) modifying by the server application the stored application into a fingerprinted application using the received fingerprint, wherein the modifying comprises:
      (c1) applying the machine fingerprint to the stored application, and
      (c2) compiling the stored application with the machine fingerprint into the fingerprinted application; and
   (d) providing by the server application the fingerprinted application to the target machine for execution, wherein the fingerprinted application will only execute correctly on the target machine.

2. The method of claim 1 further including in the server application an anti-piracy protection-wrapping function for providing the machine fingerprinting of an application in conjunction with other anti-piracy methods.

3. The method of claim 1 further including providing instructions to a software publisher on how to prepare the application software for modification by the server application.

4. The method of claim 1 further including modifying the application software based on a machine fingerprint using a byte code compiler.

5. The method of claim 1 further including modifying the application software based on a machine fingerprint using a code pre-processor.

6. A method for providing anti-piracy protection by machine fingerprinting a software application on a server, the method comprising:
   (a) providing the server with a server application for receiving and storing the application software, and for modifying the application software based on a machine fingerprint;
   (b) receiving by the server application the machine fingerprint from a target machine during a license transaction between the server application and the target machine;
   (c) modifying by the server application the stored application into a fingerprinted application using the received fingerprint;
   (d) providing by the server application the fingerprinted application to the target machine for execution, wherein the fingerprinted application will only execute correctly on the target machine;
   (e) providing instructions to a software publisher on how to prepare the application software for modification by the server application; and
   (f) selecting portions of the application software that are used frequently during the execution of the application software for protection, wherein the correct fingerprint continues to be required for continued correct execution of the application software.

7. The method of claim 6 further including updating the machine fingerprint using multiple modules within the application software during normal execution, wherein a hack on the initial machine fingerprint acquisition at program launch will be detected and defeated.

8. A method for providing anti-piracy protection by machine fingerprinting a software application on a server, the method comprising:
   (a) providing the server with a server application for receiving and storing the application software, and for modifying the application software based on a machine fingerprint;
   (b) receiving by the server application the machine fingerprint from a target machine during a license transaction between the server application and the target machine;
   (c) modifying by the server application the stored application into a fingerprinted application using the received fingerprint;
   (d) providing by the server application the fingerprinted application to the target machine for execution, wherein the fingerprinted application will only execute correctly on the target machine;
   (e) providing instructions to a software publisher on how to prepare the application software for modification by the server application; and
   (f) instructing the publisher to select portions of code in the application software to be fingerprinted by the server, package the selected portions of code for upload to the server, create data structures at the location where the selected portions of code were taken from the application software, and upload the prepared application to the server, thereby allowing the server to generate fingerprinted modules from the selected portions of application code, and replace the data structures with function calls to invoke the fingerprinted modules created by the server, whereby the application software operates correctly only on a fingerprinted target machine.

9. The method of claim 8 further including removing any remaining location information used to locate the data structures.

10. The method of claim 8 further including storing random data within the data structures to render the data structures more difficult to locate.

11. The method of claim 8 further including only uploading the selected portions of code to the server for fingerprinting and downloading to the target machine to complete the application software, wherein the application software without the fingerprinted code is sold to a target machine user, and completed for correct execution on only the target machine by the inclusion of the downloaded fingerprinted software.

* * * * *